(12) United States Patent
Bharat et al.

(10) Patent No.: US 7,308,445 B2
(45) Date of Patent: *Dec. 11, 2007

(54) METHOD FOR ESTIMATING COVERAGE OF WEB SEARCH ENGINES

(75) Inventors: Krishna Asur Bharat, Santa Clara, CA (US); Andrei Zary Broder, Menlo Park, CA (US)

(73) Assignee: Overture Services, Inc., Pasadena, CA (US)

( * ) Notice: Subject to any disclaimer, the term of this patent is extended or adjusted under 35 U.S.C. 154(b) by 320 days.

This patent is subject to a terminal disclaimer.

(21) Appl. No.: 10/761,800

(22) Filed: Jan. 21, 2004

(65) Prior Publication Data

US 2005/0055342 A1 Mar. 10, 2005

Related U.S. Application Data

(63) Continuation of application No. 09/709,003, filed on Nov. 8, 2000, now Pat. No. 6,711,568.

(51) Int. Cl.
*G06F 17/30* (2006.01)
(52) U.S. Cl. .................. 707/5; 707/3; 707/4; 707/6; 707/10
(58) Field of Classification Search .............. 707/3, 707/5, 10, 100, 4, 6, 7, 103 R, 104.1
See application file for complete search history.

(56) References Cited

U.S. PATENT DOCUMENTS

| | | | | |
|---|---|---|---|---|
| 5,701,469 A | * | 12/1997 | Brandli et al. .............. 707/102 |
| 5,842,206 A | * | 11/1998 | Sotomayor .................... 707/5 |
| 5,848,410 A | * | 12/1998 | Walls et al. ................... 707/4 |
| 5,864,863 A | * | 1/1999 | Burrows ................. 707/103 R |
| 5,873,079 A | * | 2/1999 | Davis et al. ................... 707/3 |
| 5,873,080 A | * | 2/1999 | Coden et al. .................. 707/3 |
| 5,911,139 A | * | 6/1999 | Jain et al. ..................... 707/3 |
| 5,913,215 A | * | 6/1999 | Rubinstein et al. .......... 707/10 |
| 5,926,812 A | * | 7/1999 | Hilsenrath et al. ............ 707/5 |
| 5,933,822 A | * | 8/1999 | Braden-Harder et al. ...... 707/5 |
| 6,009,459 A | * | 12/1999 | Belfiore et al. ............. 709/203 |
| 6,094,657 A | * | 7/2000 | Hailpern et al. ........ 707/103 R |
| 6,285,999 B1 | * | 9/2001 | Page ............................ 707/5 |
| 6,301,586 B1 | * | 10/2001 | Yang et al. ............. 707/104.1 |
| 6,539,373 B1 | * | 3/2003 | Guha ............................ 707/3 |

(Continued)

*Primary Examiner*—Thuy Pardo
(74) *Attorney, Agent, or Firm*—Seth H. Ostrow; Dreier LLP (57) ABSTRACT

A computerized method is used to estimate the relative coverage of Web search engines. Each search engine maintains an index of words of pages located at specific URL addresses in a network. The method generates a random query. The random query is a logical combination of words found in a subset of the pages. The random query is submitted to a first search engine. In response a set of URLs of pages matching the query are received. Each URL identifies a page indexed by the first search engine that satisfies the random query. A particular URL identifying a sample page is randomly selected. A strong query corresponding to the sample page is generated, and the strong query is submitted to a second search engine. Result information received in response to the strong query is compared to determine if the second search engine has indexed the sample page, or a page substantially similar to the sample page. This procedure is repeated to gather statistical data which is used to estimate the relative sizes and amount of overlap of search engines.

17 Claims, 7 Drawing Sheets

U.S. PATENT DOCUMENTS 6,711,568 B1 * 3/2004 Bharat et al. .................. 707/5
6,999,609 B2 * 2/2006 Eck et al. .................. 382/132
6,999,959 B1 * 2/2006 Lawrence et al. ............. 707/5

* cited by examiner

METHOD FOR ESTIMATING COVERAGE OF WEB SEARCH ENGINES

This application is a continuation application Ser. No. 09/709,003 filed Nov. 8, 2000, now U.S. Pat. No. 6,711,568 for which a Notice of Allowance has issued.

FIELD OF THE INVENTION

This invention relates generally to search engines used on the World Wide Web, and more particularly to estimating the relative sizes and overlap of indexes maintained by these search engines.

BACKGROUND OF THE INVENTION

In recent years, there has been a dramatic increase in the amount of content that is available on the World Wide Web (the "Web"). Typically, the content is organized as HTML Web pages. The total number of pages accessible through the Web is estimated to number in the hundreds of millions. In order to locate pages of interest, a large number of public search engines are currently in operation, for example, Alta Vista, Infoseek, HotBot, Excite, and many others.

A typical search engine will periodically scan the Web with a "spider" or "web crawler" to locate new or changed Web pages. The pages are parsed into an index of words maintained by the search engine. The index correlates words to page locations. Then, using a query interface, users can rapidly locate pages having specific content by combining keywords with logical operators in queries. Usually, the search engine will return a rank ordered list of pages which satisfy a query. The pages are identified by their Universal Resource Locators (URLs), and a short excerpt. The user can than use a standard Web browser to download interesting pages by specifying their URLs, most often using "hot" links.

Another type of search engine, called a meta-search engine—e.g., "http://www.metacrawler.com" which accepts a query from a user, and passes the query to a number of conventional search engines. Meta-search engines may well be useful if the amount of overlap between indexes of popular search engines is low.

Therefore, users and designers of search engines are often interested in knowing how good the coverage is of different search engines. Here, coverage means the relative sizes of the indexes, i.e., the number of pages indexed, and the relative amount of overlap between indexes, i.e., the number of pages of one search engine indexed by another.

However, currently there is no good way to measure relative coverage of public search engines. Although many studies have tried to measure coverage, the studies often reach contradictory conclusions since no standardized test has been defined. A large bibliography of such studies is maintained at: http://www.ub2.lu.se/desire/radar/lit-about-search-services.html.

Most comparisons are highly subjective since they tend to rely on information such as spider-access logs obtained from a few sites. Often, they make size estimates by sampling with a few arbitrary chosen queries which are subject to various biases and/or using estimates provided by the search engines themselves. In either case, this makes the estimates unreliable.

For example, if a search engine claims a search result of about 10,000 pages, then the result may well include duplicate pages, aliased URLs, pages which since have been deleted. In fact, the search engine itself may only scan a small part of its index, say 10%, and return the first couple of hundred pages. The total number of qualifying pages that it thinks it has indexed and could have returned is just an extrapolation.

Therefore, it is desired to provided a standardized method for measuring the relative coverage of search engines. It should be possible to work the method without having privileged access to the internals of the search engines. That is, it should be possible to estimate the coverage from public access points.

SUMMARY OF THE INVENTION

A method is provided for estimating coverage of search engines used with the World Wide Web. Each search engine maintains an index of words of pages located at specific addresses of a network. A random query is generated. The random query is a logical combination of words found in a subset of Web pages. Preferably, the training set 311 of pages is representative of the pages on the Web in general, or possibly a particular domain.

The random query is submitted to a first search engine. The first search engine returns a set of addresses in response. The set of addresses identify pages indexed by the first search engine. A particular address identifying a sample page is randomly selected from this set, and a strong query is generated for the sample page. The strong query is highly dependent on the content of the sample page. The strong query is submitted to other search engines.

The results received from the other search engines are compared to information about the sample page to determine if the other search engines have indexed the sample page. In other words, random queries are used to extract random pages from one search engine, and strong queries derived from the random pages are used to test if other search engines have indexed the page. Thus, the relative size and overlap between the first and other search engines can be estimated.

In one aspect of the invention, a lexicon of words is constructed from the a training set of pages, and the frequencies of unique words in the lexicon is determined. The lexicon and word frequencies can be used to select words combined into the random query. The random query can be disjunctive or conjunctive. In another aspect of the invention, the strong query is a disjunction of a two conjunctive queries.

DETAILED DESCRIPTION OF THE PREFERRED EMBODIMENT

The Web

Figure 1:
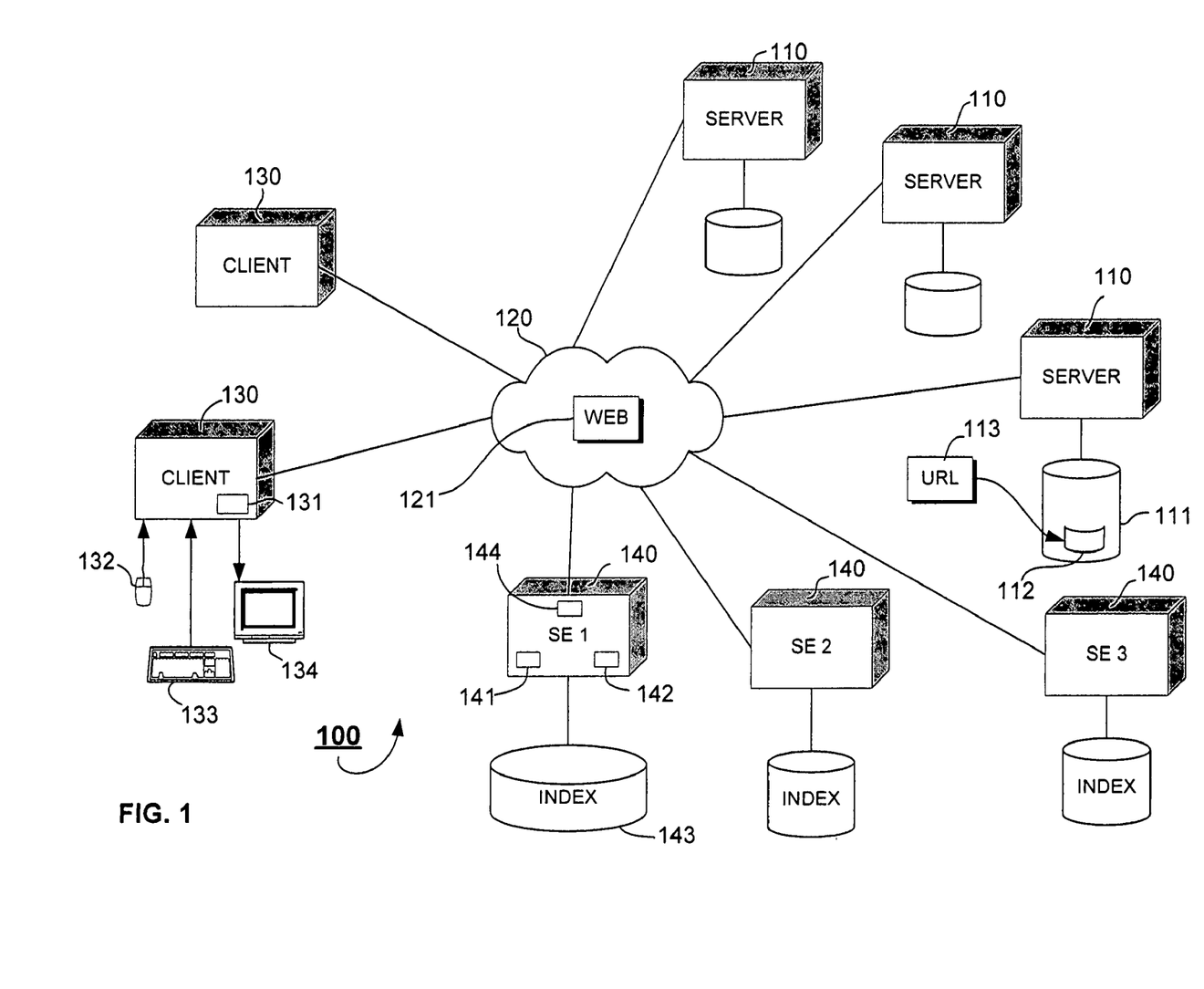
FIG. 1 is a block diagram of a distributed computer system that uses the estimating method according to the invention.

FIG. 1 shows an arrangement 100 which uses the Web coverage estimation method of the invention. A plurality of computers 110, 130, and 140 are connected to each other by a communications network 120, for example, the Internet. The Internet includes an application level interface called the World-Wide-Web (Web 121). Server computers 110 maintain multimedia content 111, for example, HTML Web pages 112. The location of any page 112 is specified by its Universal Resource Locator (URL) 112.

Client computers 130 typically are lap-tops, personal computers, or workstations having input/output (I/O) devices such as a mouse 132, a keyboard, and a monitor 134. Usually, each client 130 is also equipped with a Web browser 131 such as the Netscape Navigator™, or the Microsoft Internet Explorer™. The application level browser executes under an operating system such as Unix™, NT™, or Windows™.

During operation of the arrangement 100, users of the clients 130 desire to access content 111 of the servers 110. More particularly, the users want to locate specific pages 112 of interest.

In order to assist the users of the client computers to locate Web content 111, search engines 140 are also connected to the network 120. A particular search engine 140, for example Digital Equipment Corporation's AltaVista search engine, includes a Web spider 141 that periodically scans the "Web" for changed or new content. An indexer 142 maintains a full word index 143 of content located by the spider 141. The search engine 140 is also equipped with a query interface 144 to process queries submitted by the users to quickly locate indexed pages.

Coverage Defined

Figure 2:
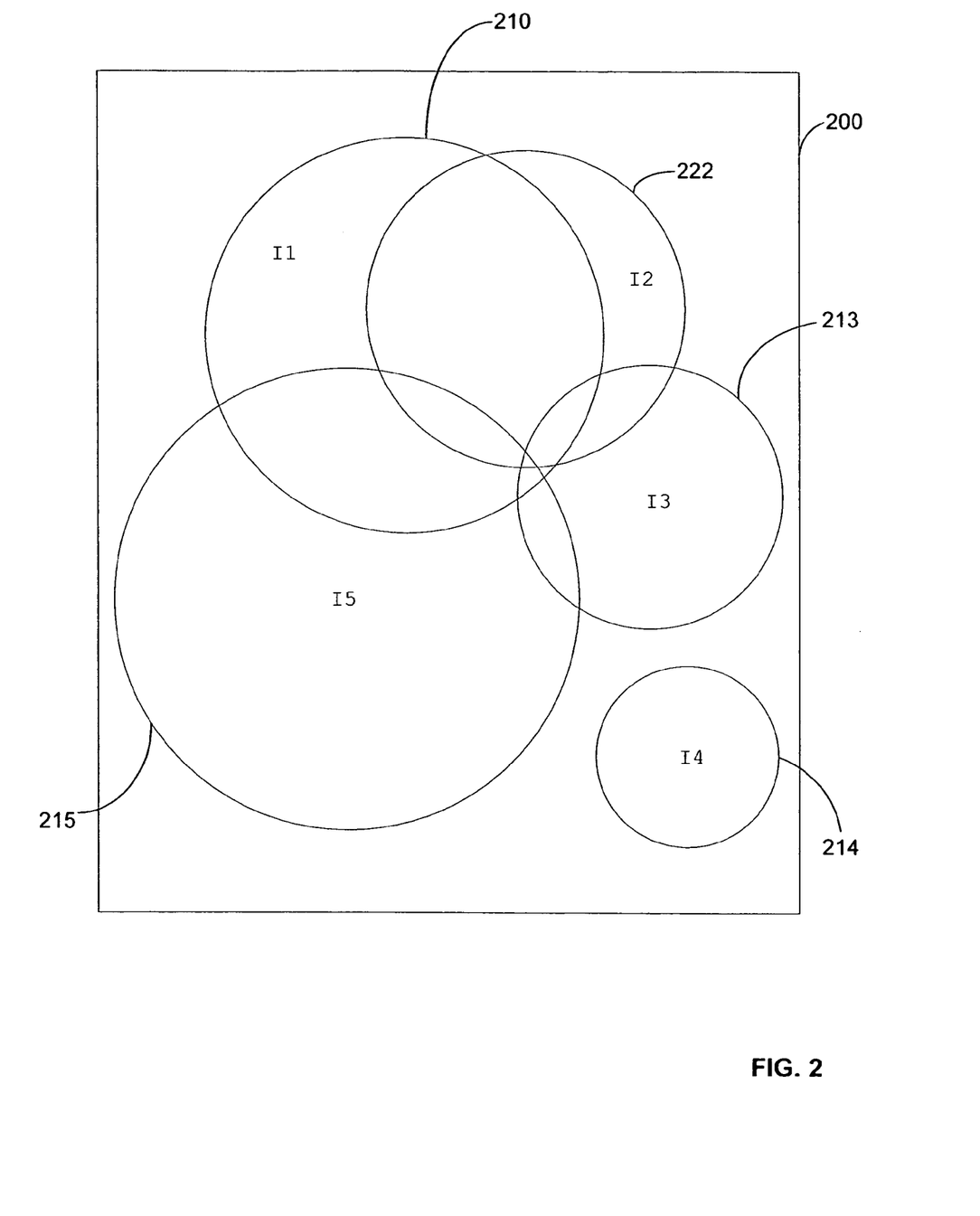
FIG. 2 is a graphic representation of sizes and overlap of search engine indexes.

As shown in FIG. 2, different search engines maintain indexes I1-I5 for the total Web 200. The relative size of the indexes I1-I5 is indicated by the sizes of the circles 211-215. The relative overlap is indicated by the intersection of the circles 211-215. The relative sizes can be expressed as the ratios, for example, I1:I3, or I5:I4. The overlap can be expressed as the fraction of one index that is also indexed by another search engine.

The preferred method for estimating coverage, described in greater detail below, includes a sampling procedure and a checking procedure.

Sampling:

The sampling procedure selects random Web pages. Random queries are constructed for selecting pages. The random queries are submitted to various search engines. A randomly chosen page from the results returned by the search engine, in each case, constitute a sample.

Checking:

A strong query is constructed for the sample page, and the strong query is submitted to various search engines to determine if the sample page is indexed.

If there is a simple way to randomly select a page, and an efficient technique to check whether a page is indexed or not, then an obvious method would randomly select a reasonably large sample of pages, and for each page, check whether or not a search engine has indexed the page. This would allow one to estimate the relative sizes of the engines, and their size relative to the entire Web.

Unfortunately, choosing random pages uniformly from the entire Web is practically unfeasible. This would require one to collect all valid URLs on the Web. There are problems with this. None of the extant spiders lay claim to the capability that they are able to locate all valid URLs. Indeed, rough statistics would seem to indicate that even the best spiders, in a reasonable amount of time, locate fewer than half of the total number of pages that are believed to be on the Web. In addition, the Web is too amorphous, pages are here one moment, and gone the next. New pages appear at a rapid rate. For example, an efficient spider may detect tens of thousands of new pages each day.

Since direct random sampling of the Web is not practical, the preferred method uses the search engines themselves to generate page samples. Given a mechanism for selecting a reasonable sample from all of the pages indexed by a particular search engine, it becomes possible to estimate relative sizes and amount of overlap as follows.

Relative Size and Overlap

For search engines maintaining indexes I1 and I2, their relative size ratio is estimated by:

$$\frac{\text{Fraction of } URLs \text{ sampled from } I2, \text{ contained in } I1}{\text{Fraction of } URLs \text{ sampled from } I1, \text{ contained in } I2}$$

and, the overlap of I1 inside I2 can be estimated by determining:

Fraction of URLs sampled from I1 contained in I2.

However, uniformly selecting a page at random from the set of pages indexed by a particular search engine is difficult to do without some privileged access to the search engine's index. Therefore, in order to overcome this problem, the present method uses query based sampling.

The samples are obtained by generating random queries, as described below. The random queries are submitted to the various search engines, and a random URL is selected from the result sets produced in response to the random queries. The URLs uniquely identify the pages. In practice, the result sets can be quite large, for example, hundreds or thousands of pages. Therefore, the random URL is selected from the first, for example, hundred result pages in a set. The bias that this may introduce is discussed below.

Sampling Procedure

Figure 3:
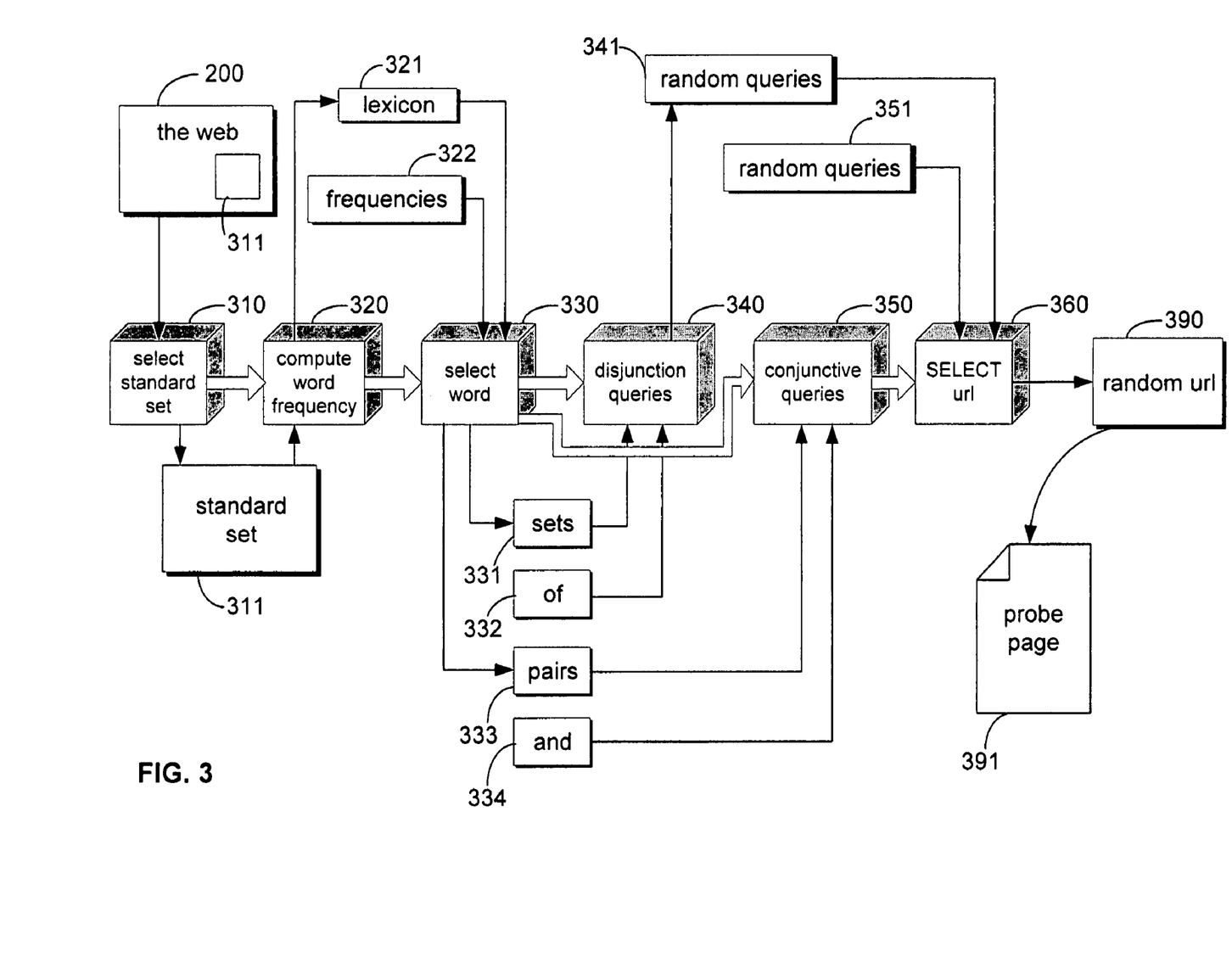
FIG. 3 is a flow diagram of a sampling procedure used by the invention.

As shown in FIG. 3, a "training" set 311 of pages of the entire Web 200 is selected in step 310. Preferably, the pages of the training set 311 are indexed by all search engines being estimated, i.e., the standard set 311 is representative of the pages indexed by the search engines to be estimated. For example, the training set 311 can be selected from pages maintained by the Yahoo™ service. These pages are well known and indexed by most search engines. It is desirable that the distribution of words in the training set 311 reflects the total content of the Web 200, i.e., the pages include "slang" words commonly used in the Web pages, and their frequencies of occurrence reflect the entire Web 200.

In step 320, a lexicon 321 of the words of the pages of the training set 311 is constructed, and the relative frequencies 321 of the words in the lexicon 321 is computed. Of course, if a single training set is used, then the set may be biased towards a particular language, for example, English. In principle, it is possible to select a corpus of standard pages in any language, or context domain, and to construct the lexicon 321 and frequencies 322 accordingly. Perhaps, the context domain can specify content about a particular subject area, for example, zoology.

The lexicon 321 and frequencies 322 will be used to construct the random queries. A typical query is constructed by lexicon words with operators. The operators can be disjunctive or conjunctive. For example, "apples and oranges," or "apples or oranges." The exact syntax of a particular query depends on the search engine that is used to process the query.

Therefore, in step 330 words are randomly selected from the lexicon 321. To construct disjunctive queries 341, step 340 disjunctively combines a fixed size set of words 331 with the "or" operators 332, for example, sets having four words as members. The words are selected so their relative frequencies are approximately the same, because some search engines allow word frequencies to influence their ranking.

Conjunctive queries 351 are constructed in step 350 from pairs of randomly selected words 333 linked by the "and" operator 334. Using more than two words in a query will frequently lead to no results. The word pairs can be selected so that the expected result is generally between 1 and 100 pages.

This can be done as follows, The words in the lexicon 321 are sorted according their frequencies 322. Upper and lower frequency thresholds are established itteratively so that words equidistant from the thresholds tend to give between 1 and about 200 result pages when used in a conjunctive query that is submitted to a search engine. Then the words contained between the thresholds are randomly sampled. The resulting words are again sorted by frequency, and words equidistant from the end of the sorted list are used to form the conjunctive pairs 333.

The random disjunctive and conjunctive queries 341 and 351 are submitted to the various search engines 140, and a random URL 390 is selected in step 360 from the first hundred results returned in each case. The randomly selected URL uniquely identifies a particular "probe" or "sample" page 391. As described below, the existence of the "sample" page 391 in the various search engines to be estimated is confirmed by the checking procedure.

This approach may be subject to various biases that are hard to remove. For example, most search engines tend to present results in a manner which they believe is more useful. By some criteria, "important" pages are listed in the result before less significant ones, that is the results are ordered according to some ranking policy determined by a particular search engine. In addition, the randomized query construction described above may weight in favor of some pages. In this case, eventually what is estimated is the ratio of the total weight of the pages indexed by a particular search engine.

A rejection method, to minimize bias is described below. However, the bias introduced above may be considered reasonable. In fact, the bias may be favorable in the sense that the sampling procedure gives a higher weight to "interesting" pages, namely pages rich in content in the language or context domain of choice.

Checking Procedure

Figure 4:
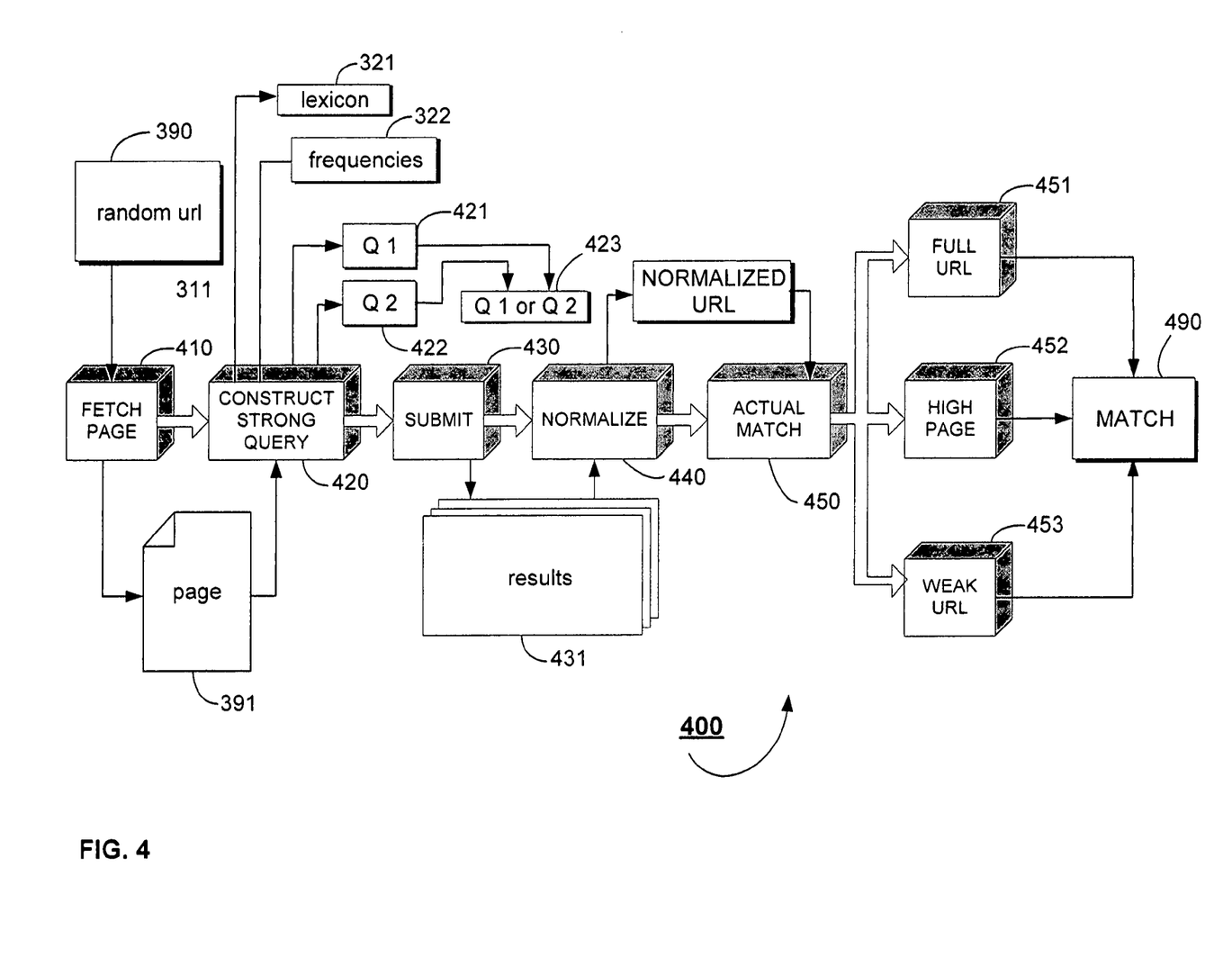
FIG. 4 is a flow diagram of a checking procedure used by the invention.

FIG. 4 will be used to illustrate the checking procedure 400. Here, the intent is to check whether the sample page 391 identified by the random URL 390 is indexed by a particular search engine. In order to do this, a query is constructed which is meant to strongly identify the sample page. Ideally, the query will exactly determine whether the page identified by the URL 390 matches one of the pages returned in response to the checking probe, because the probing query may yield multiple matching results.

There are several reasons why multiple matching results may be obtained. An identical page may be accessed through a number of "alias" URLs. Several "nearly" identical versions of the page may be indexed, that is, the various versions may differ in formatting detail, or header information, or minor editing differences. Mirrored copies of the page may be maintained by different servers 130 having different host names. Experimental results would seem to indicate that as many as 20% of the pages indexed by a typical search engine are substantially similar.

In some cases, the sample page may contain minimal content so a strong query which uniquely selects the page is difficult to construct, and multiple results ensue. How to cope with these problems is described below.

As shown in FIG. 4, the checking procedure receives as input the URL 390. In step 410, the sample page 391 is fetched. In step 420, a strong query is constructed. The strong query 423 combines a predetermined number, e.g., eight, significant words of the sample page 391. Here, the significance of a word is taken to be inversely proportional to the frequency of the word in the lexicon. Words of the sample page 391 not found in the lexicon are ignored because they may be missspellings, or words in other languages. In the later case, their frequencies may not be available.

To cope with pages that may have changed since they were indexed, the strong query can be constructed by using twice the number of significant words, i.e., 2k words $w_0$, $w_1, \ldots, w_{2k-1}$. In other words the strong query 423 is a disjunction of two strong conjunctive queries, Q1 421 and Q2 422. Q1 combines the keywords $w_{2i-1}$, where "i" is the significant word's frequency rank, and "i" is selected from the interval 1, . . . , k. Q2 combines words $w_{2i}$. Now it becomes possible to detect slight differences in pages indexed by the search engines 140.

In step 430, the strong query 423 is submitted to the search engines, and the results are examined. If one of the results matches the random URL 390, then the URL is noted as being present in the search engine's index.

The matching is performed in two steps. First, the URLs of the result pages 431 are normalized in step 440. During normalization, upper case characters in the URL are changed to lower case, and file names considered optional in HTML such as "index.html" are eliminated, as are relative references of the form "# . . . ," and server port numbers. Host names are translated to IP addresses when one of the URLs involves an IP address.

The results are matched with the sample page 391 in step 450. The matching includes possible matching techniques 451-453 depending on the level of matching required.

Full URL Comparison

In this case 451, the sample page is deemed to be "present" (indexed) only if the normalized URL returned by the search engine is identical to the URL of the sample page 391.

High Resemblance

In the case 452, the entire set of pages listed by the search engine as matching the query is retrieved and their contents are compared with the sample page. The comparing can be done using standard document resemblance techniques, perhaps measuring the syntactic "distance" between the documents. Various techniques for performing document resemblance are known. Documents which resemble each other above some threshold, say 95%, are said to be matching.

Weak URL Comparison

In this case 453, only the host names are compared. The sample page is deemed to be present in the search engine when the result page has an associated host name which matches the host name of the sample page.

Note, it may very well turn out that the URL returned by the search engine being checked no longer points at the page indexed by the search engine, e.g., the URL has been recycled, or the content of the page has changed substantially since it was indexed. Compensation techniques for these problems are discussed below.

Filtering Dynamic and Impoverished Pages

Figure 5:
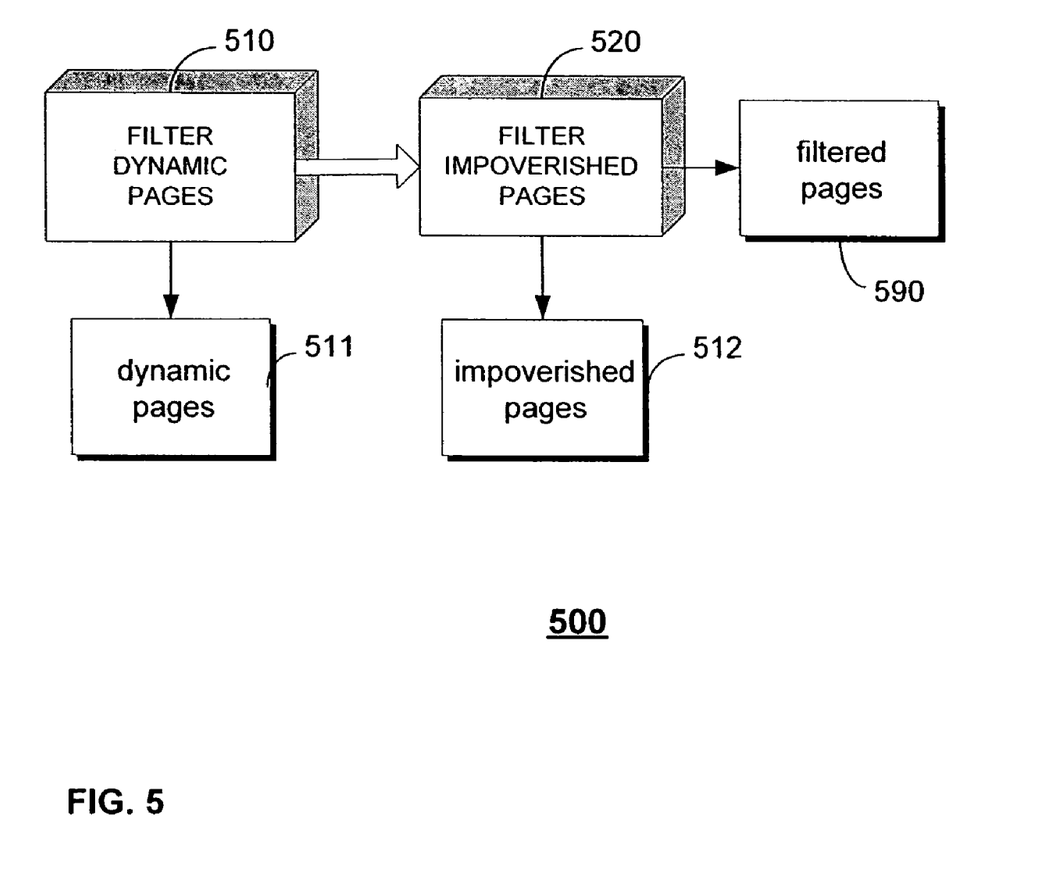
FIG. 5 is a flow diagram of a filtering procedure.

A filtering procedure 500 is shown in FIG. 5. Sample pages that cannot be found in any search engine may be regarded as a dynamic pages. Dynamic pages 511 can be discarded from the statistics in step 510 on the assumption that they contain rapidly changing content, for example pages giving stock minute-by minute quotes, or daily weather forecasts.

It also is possible that pages contain very little content (impoverished pages) which makes the strong query ineffective. Filtering out URLs of impoverished pages 521 in step 520 allows one to focus on content rich pages with relatively static content.

These steps 510 and 520, that produce filtered pages 590, may skew the results. The filtered pages 590 are provided as input to the comparing step 490 of FIG. 4. The computed estimates reflect pages that are relatively static and content rich. Although these pages may not represent the entire Web, they reflect the portion of the Web that users are most likely to query, and hence estimates derived from filtered results may be a more meaningful measure of a particular search engine's utility. Query based random sampling is inherently biased towards pages rich in content, hence the bias is inevitable.

Because the query based method for generating random URLS is subject to certain biases, a method is described to compensate for this bias by "smoothing" the estimates.

Rejection Method for Generating Uniform Probabilities

Any random sampling of search engines is going to be inherently biased towards that portion of the entire Web that is indexed by the search engines. If one chooses to ignore this bias, then the following problems still persist.

Ranking Bias: Search engines introduce additional bias by rank ordering their results and limiting the size of the returned set, for example, to the most highly ranked two hundred pages. Because only a subset of the pages satisfying the given queries is returned, the remaining pages are effectively not accessible.

Query Bias: The likelihood that a particular page is chosen during sampling depends on the probability that particular words within that page will be selected for inclusion in queries, and on the total number of words within the page that might be selected for inclusion in queries. The more such words within a page, the greater the likelihood that the page is selected.

In order to remove the ranking bias, conjunctive queries can be framed to match fewer pages than the maximum number of pages returned by the search engine under consideration. In practice, this may be difficult to guarantee and would also increase the query bias problem.

Figure 6:
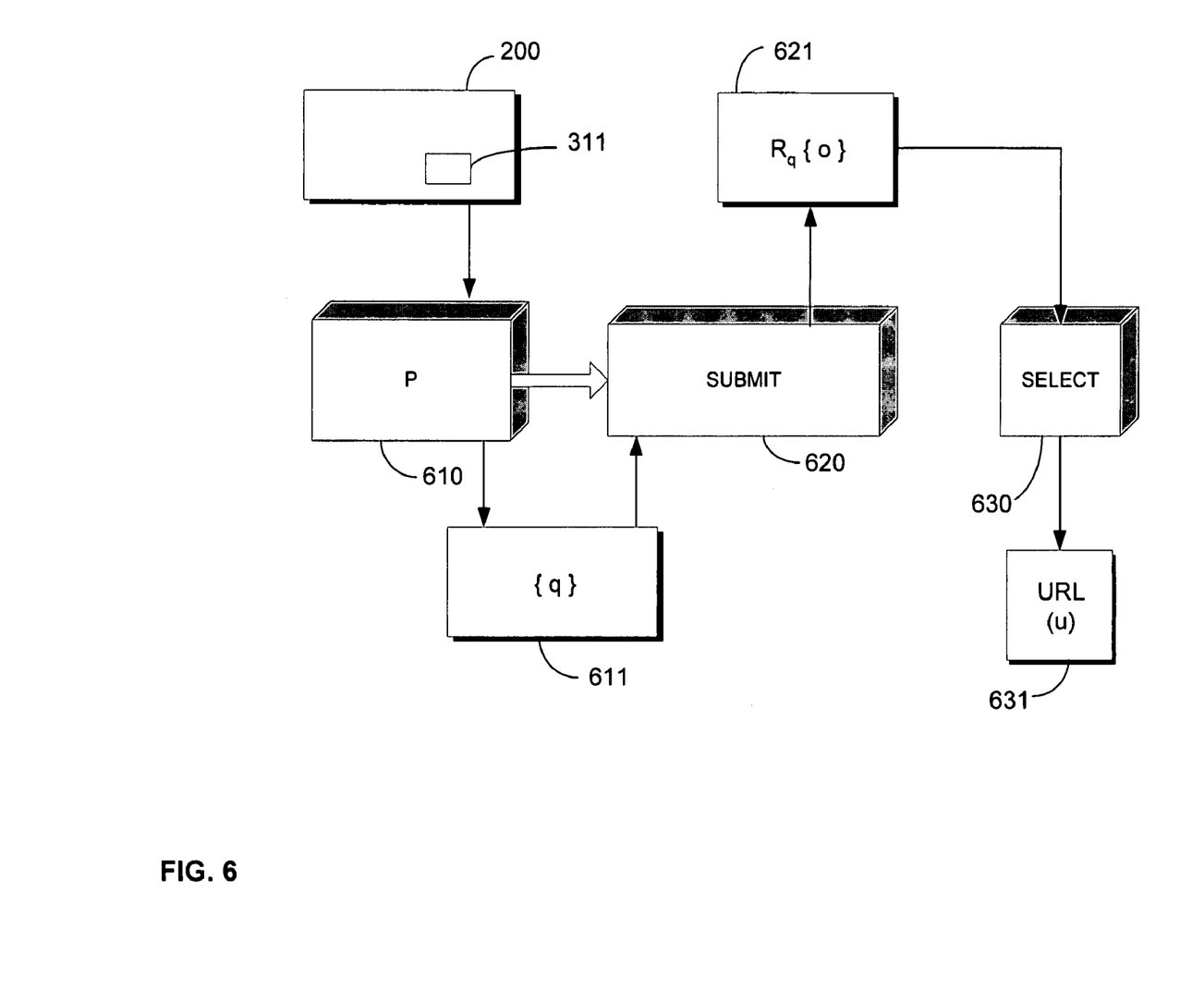
FIG. 6 is a flow diagram used to illustrate bias.

As shown in FIG. 6, removing the query bias from the query-based process as described above is more difficult. The general situation is that a process (P) 610 generates a random query q 611 with some probability distribution, e.g., step 310-390 of FIG. 3. The query q 611 is submitted (S) 620 to the search engine used for generation to return a set of URL results $R_q$ 621 matching q. Then a procedure SELECT 630 selects by some probabilistic method a particular URL (u) 631, which will be eventually tested for containment within the pages indexed by other search engines, for example as depicted in FIG. 4.

For a particular URL u to be generated by the process above, the URL u first needs match the query q 611, that is, to belong to the set $R_q$ 621, and second the URL 631 needs to be selected from within the set $R_q$ 621.

That is, the probability $p_{out}(u)$ that a URL u is generated is equal to the sum over all the queries q that match u of the probability $p_{gen}(q)$ that process P 610 generates q times the probability $p_{sel}(u,q)$ that SELECT 630 selects URL u from the set $R_q$ 621, that is:

$$p_{out}(u) = \Sigma p_{gen}(q) \times p_{sel}(u,q)$$

Consider the probability $p_{incl}(u)$ that the query generated by the process P 610 matches a particular URL u. If this probability were the same for all the URLs of all pages indexed by the search engines, then one can use process P 610 to generate the set $R_q$ 621 and select every URL in $R_q$, that is, set $p_{sel}(u,q)=1$.

However, this simplistic scenario is not the case because query bias is injected by the sampling procedures 300. A compensation procedure for this bias is now described.

Bias Compensation

Figure 7:
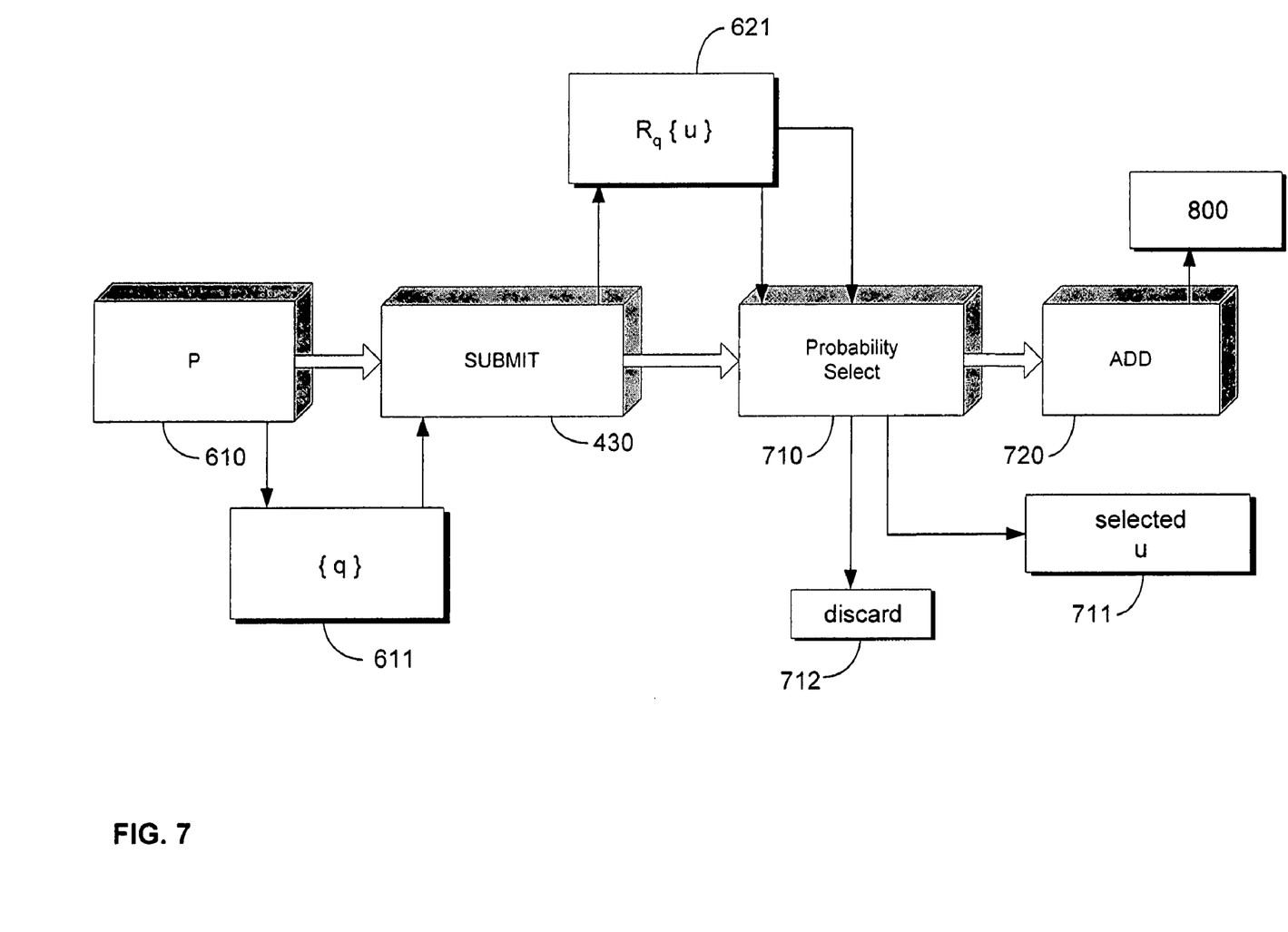
FIG. 7 is a flow diagram of a procedure for minimizing bias.

Let $p_0$ (or minimum inclusion probability) be the minimum value of $p_{incl}(x)$ for all URLs x. To compensate for the bias in inclusion one can "tune" the selection mechanism as shown in FIG. 7:

Use procedure P 610 to generate a random query q 621 and submit 430, and the consider every URL u in the set $R_q$ 621 and select u 711 with some probability in step 710. Specifically:

$$p_{sel}(u,q) = p_0/p_{incl}(u)$$

If URL u is 711 selected, then that URL is added in step 720 to the set of generated URLs 800; otherwise it is discarded 712. This process is repeated until there are enough URLs in the generated set.

In practice this compensation is difficult to realize. Result set sizes will vary from zero to tens of thousands. In the latter case, retrieving the entire result set is not feasible. Since the probability $p_{incl}(u)$ is likely to vary considerably rejection will happen often. For both the above reasons the number of times the process P 610 is run may need to be quite large since many runs would result in no URL being selected.

Estimating $p_{incl}(u)$ is difficult. However, in principle this can be done. First one needs to list all possible queries q such that u is in $R_q$ and sum the probability of each of them being generated by the process P 610.

Estimating $p_0$ is even more difficult. One could choose a suitable value for $p_0$, say 1/|U| where U is the current estimate of the set of URLs on the web, and ignore URLs with $p_{incl}$ values less than $p_0$. This may result in a large number of trials before any URL would be selected for checking. Alternatively one can choose $p_0$ to be substantially larger on the basis that pages that have $p_{incl}$ too small are "uninteresting," assuming all terms of interest are in the lexicon, but this is again introduces a bias.

Privileged Access

In an alternative embodiment, privileged access to a search engine is used to estimate coverage. Now, it becomes easier to generate a uniform set of random URLs. Interestingly, in one experiment using the Alta Vista search engine, estimates produced with privileged access yielded lower levels of overlap, to confirm the query bias described above. The experiment showed that easily queried pages are richer in content, and hence are more likely to be cross indexed.

SUMMARY

The method as described above, in contrast with the mostly subjective techniques of the prior art, has a clear objective basis. Although the present method accords preference to long, content rich pages in the language or context domain of choice, the bias is well understood, and is computable for every page on the Web.

Consequently, the method allows one to estimate the amount of coverage of public search engines. Furthermore, by modifying the lexicon accordingly, the method can be biased towards coverage with respect to a particular language, or topic, for example, pages which include astrological, or zoological terms.

It is understood that the above-described embodiments are simply illustrative of the principles of the invention. Various other modifications and changes may be made by those skilled in the art which will embody the principles of the invention and fall within the spirit and scope thereof.

We claim:

1. A computerized method for estimating coverage of search engines, each search engine maintaining an index of words of pages located at specific address in a network, comprising the steps of:
   generating a random query, the random query being a logical combination of words found in a training set of the pages;
   submitting the random query to a first search engine;
   receiving a set of URLs in response to the random search query;
   randomly selecting a particular URL identifying a sample page;
   generating a strong query for the sample page;
   submitting the strong query to a second search engine;
   comparing result information received in response to the strong query to determine if the second search engine has indexed the sample page; and
   generating an estimate of the relative sizes and amount of overlap of the indices of the first and second search engines.

2. The method of claim 1 comprising estimating relative sizes of the indices of the first and second search engines by dividing a fraction of a first set of pages sampled from the second search engine that are contained in the first search engine by a fraction of a second set of pages sampled from the first search engine that are contained in the second search engine.

3. The method of claim 2 comprising estimating a relative amount of overlap of the indices of the first and second search engines by computing a fraction of a set of pages sampled from the second search engine that are combined in the first search engine.

4. The method of claim 1 wherein the training set of pages relates to a particular context domain.

5. The method of claim 1 wherein the random query combines random words selected from the training set with a logical operator.

6. The method of claim 1 wherein the random query is a disjunctive query.

7. The method of claim 6 wherein the disjunctive query combines a set of words using OR operators, the set of words having a predetermined size.

8. The method of claim 7 wherein the words of the training set have relative frequencies that are substantially similar.

9. The method of claim 1 wherein the random query is a conjunctive query combining a pair of words and an AND operator.

10. The method of claim 9 comprising:
    sorting the words in the training set according to frequencies of the words; and
    establishing an upper frequency threshold and a lower frequency threshold so that when words equidistant from the upper and lower thresholds are combined in the conjunctive query, a set of addresses is less than or equal to a predetermined maximum number of members.

11. The method of claim 1 wherein the network is the World Wide Web and comprising:
    fetching the particular URL from the first search engine;
    fetching a corresponding page from the World Wide Web; and
    constructing the strong query to be representative of the sample page.

12. The method of claim 1 wherein the result information includes URLs of pages indexed by the second search engine.

13. The method of claim 12 wherein the URLs of the pages indexed and addresses identifying the sample pages are normalized before the comparing.

14. The method of claim 12 wherein the result information being compared is content of the sample page, and content of the pages indexed by the second search engine.

15. The method of claim 12 wherein the result information includes host names.

16. The method of claim 1 comprising discarding dynamic and outdated pages before comparing.

17. The method of claim 1 wherein privileged access is provided to the first search engine.

* * * * *